United States Patent

[11] 3,588,087

| [72] | Inventors | Herman Rovin<br>East Norwalk;<br>Fred J. Schiffmacher, New Canaan, Conn. |
|---|---|---|
| [21] | Appl. No. | 840,076 |
| [22] | Filed | Apr. 14, 1969<br>Division of Ser. No. 619,302, Feb. 28, 1967,<br>Pat. No. 3,531,107 |
| [45] | Patented | June 28, 1971 |
| [73] | Assignee | Ivanhoe Research Corporation<br>New York, N.Y. |

[54] METHODS AND APPARATUS FOR AUTOMATICALLY REGISTERING AND COMBINING FABRIC WORKPIECES
13 Claims, 10 Drawing Figs.

[52] U.S. Cl. .................................................. 270/58,
271/54
[51] Int. Cl. ..................................................... B65h 39/02
[50] Field of Search .......................................... 270/58

[56] References Cited
UNITED STATES PATENTS

| 2,579,094 | 12/1951 | Rooksby .................... | 270/58X |
| 3,249,483 | 5/1966 | Kauffman et al. ........... | 156/364 |
| 3,268,222 | 8/1966 | Off ............................ | 271/74 |
| 3,351,032 | 11/1967 | Junkins ...................... | 112/2 |

*Primary Examiner* — Robert W. Michell
*Assistant Examiner* — Paul V. Williams
*Attorney* — Kenneth E. Merklen ABSTRACT: A method and apparatus for automatically registering fabric workpieces for use in a production line to bring an edge or edges of the workpieces into accurately known locations and then for combining the registered workpieces together in readiness for joining them. Force impulses are applied to the workpiece by pulsating air jets flowing beneath the workpiece, the pulses of air being generated by valving or fluttering vibrating reed elements or both for agitating the workpiece to reduce friction effects as the workpiece is impelled by the impulses edgewise toward stop surfaces to register it. In certain embodiments pulsating air jet units are mounted on a movable or invertible head which accomplishes the dual functions of registering a workpiece and then of moving or inverting the workpiece to combine it with another workpiece. The head holds the registered workpiece in position thereon by suction during motion. In modified embodiments a revolving suction member is mounted upon the movable head to provide the dual functions of registering and combining.

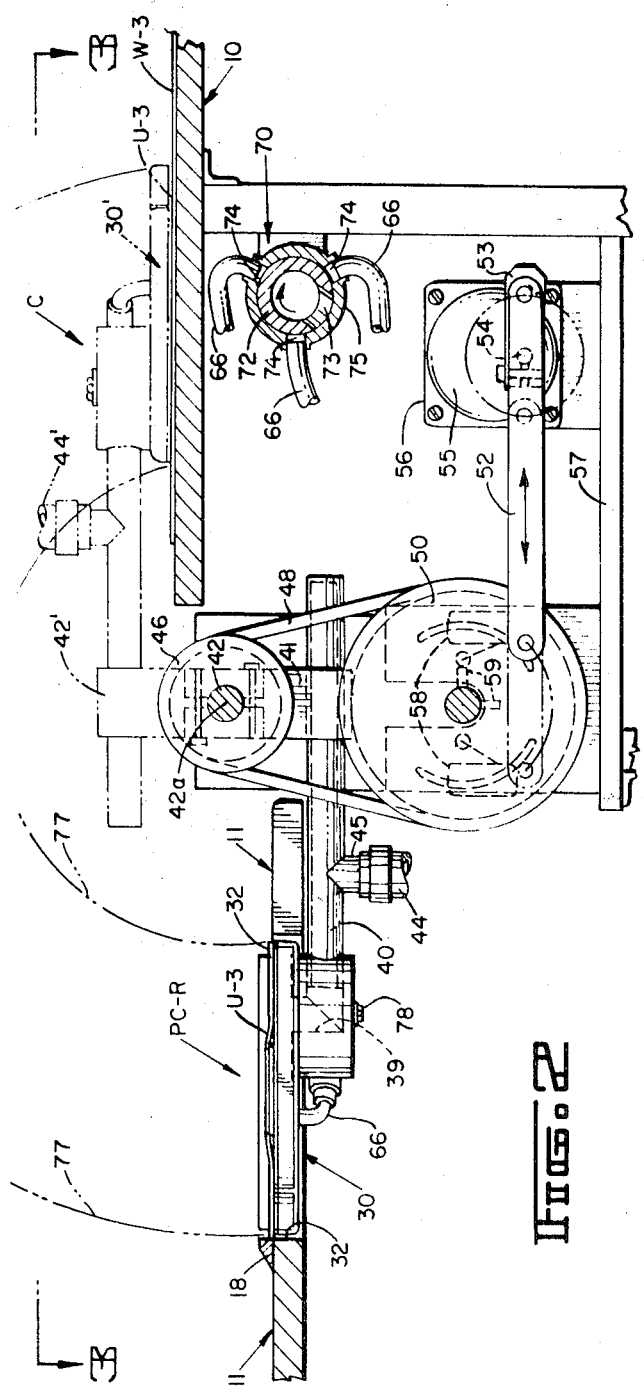
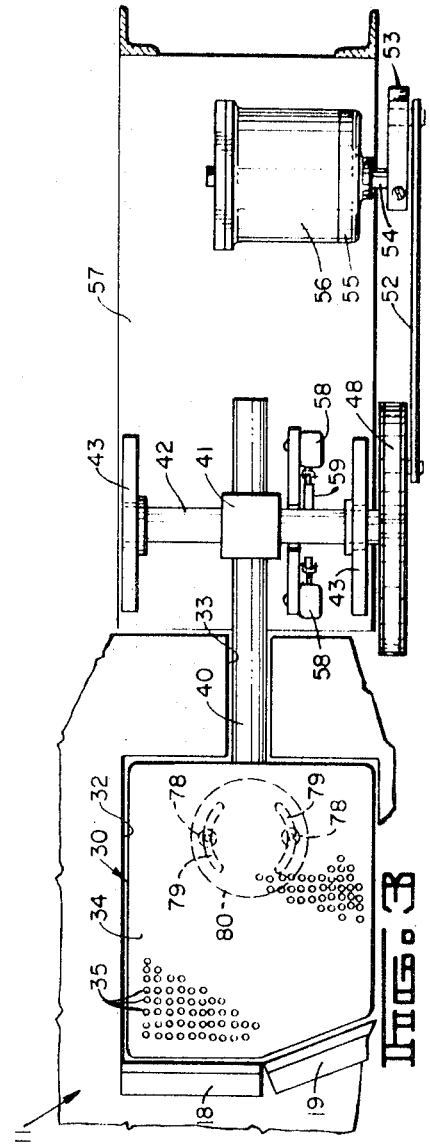
FIG. 2
FIG. 3

INVENTORS
HERMAN ROVIN
BY FRED J. SCHIFFMACHER

*Robertson, Bryan, Parmelee & Johnson*
ATTORNEYS.

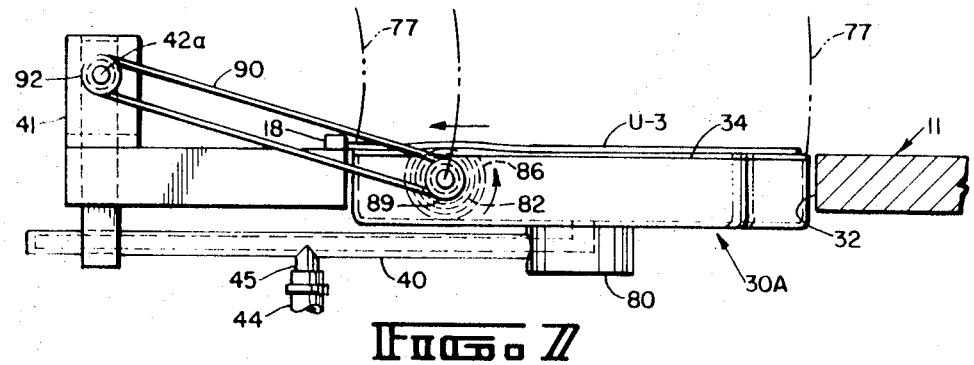
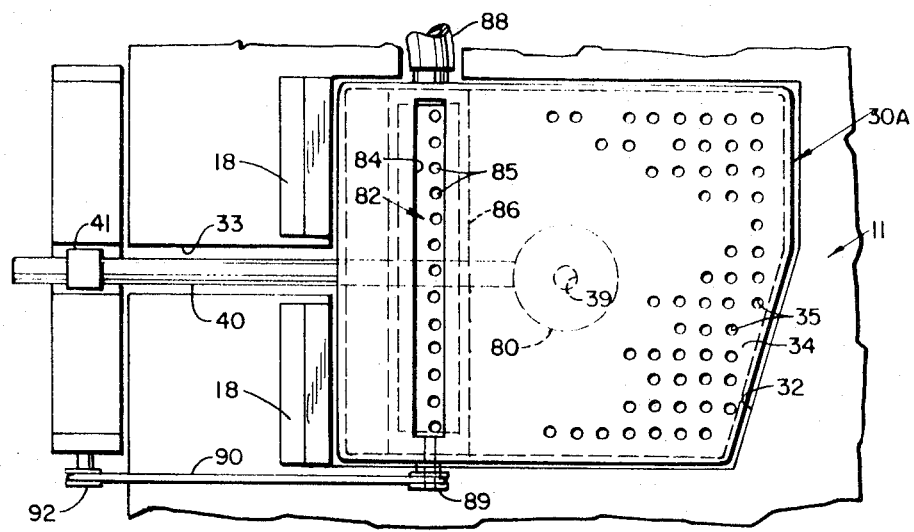
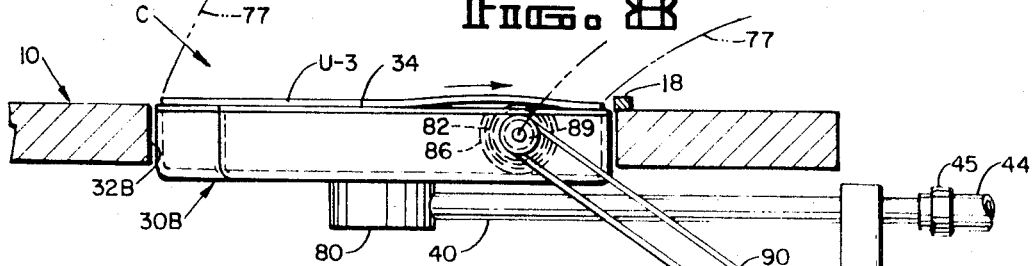
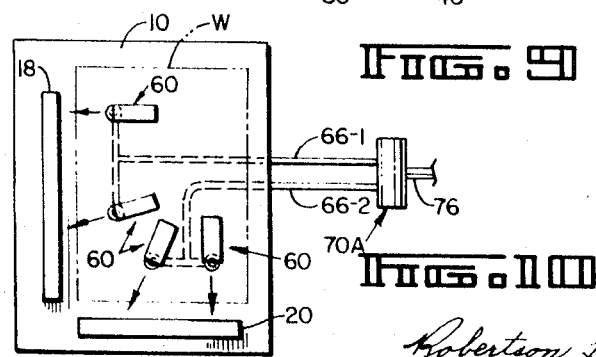

3,588,087

METHODS AND APPARATUS FOR AUTOMATICALLY REGISTERING AND COMBINING FABRIC WORKPIECES

CROSS-REFERENCE TO RELATED APPLICATIONS

This application is a division of application Ser. No. 619,302, filed Feb. 28, 1967.
George F. Hawley and John H. Buettner
Ser. No. 475,986, filed: July 30, 1965
"Methods and Apparatus for Automatically Transferring and Registering Fabric Workpieces and for Combining Them."
George F. Hawley
Ser. No. 601,768, Filed: Dec. 14, 1966
"Method and Apparatus for Treating Fabric Workpieces in Sequence at a Plurality of Work Station."
Herman Rovin
Ser. No. 524,879, Filed: Feb. 3, 1966
"Apparatus for Registering a Fabric Workpiece."
The above applications are assigned to
AEL Systems, Inc. as is the present application The present invention relates to methods and apparatus for automatically registering and combining fabric workpieces. More particularly, the invention relates to such methods and apparatus adapted for use in automatic production systems for manufacturing fabric goods such as clothing, headgear, footgear and the like including subassemblies of such goods.

At the present time the garment and fabric workpiece assembly industry is characterized by substantial amounts of tedious, repetitions, monotonous hand labor in producing finished goods. This invention is intended for use in this field to enable machinery to be used to relieve human beings of the need to perform much of this drudgery. Among the advantages of this invention are those resulting from the fact that it provides registration and combining methods and apparatus which are very flexible in application and are adapted for handling a wide variety of types and sizes of fabric goods when utilized in a production system. This invention enables each individual workpiece to be brought automatically into an accurately known relationship with respect to other workpieces so that these workpieces can be accurately combined together in readiness for fastening them to provide the desired size and shape in the end product. In the illustrative examples of the invention, the assembled multiple workpieces of fabric are subsequently fastened together by sewing them to complete a component of a garment.

As used herein the term "workpiece" is intended to include individual pieces as well as subassemblies or semifinished goods including two or more pieces or components secured together by suitable fastening. The term "fabric" is intended to include woven goods and also nonwoven or felted, porous or perforated goods, and similar goods having flexible or pliable characteristics which are suitable for use in clothing, headgear, footwear, and similar uses, regardless of whether the material of the goods is in one layer or multiple layers and regardless of whether the goods are natural, synthetic, or blended.

The term "registration" or "registering" is intended to mean the bringing of a fabric workpiece into a very accurately known position and orientation with respect to one or more reference elements whose position and orientation in the equipment is precisely known. These reference elements are referred to as "stop surfaces" in the illustrative examples of this invention. When two workpieces have individually been registered, then, since the position and orientation of each one with respect to the other is established to enable them to be brought together in proper relationship for assembly and fastening as by sewing.

The term "combining" is intended to mean the bringing together, that is, the assembly of two or more previously registered workpieces so that their positions and orientations remain known. Thus, the combined registered workpieces are ready for work automatically to be performed upon them, for example, they are ready to be suitably fastened together as by sewing them, cementing them, riveting or fusing them together at one or more points.

In accordance with the present invention in certain of its aspects force impulses are applied to fabric workpieces by pulsating air jets flowing beneath the workpiece. The air jets are pulsated by oscillating valving to impel and agitate the workpiece being registered. Fluttering vibrating reed elements are provided for agitating the workpiece to reduce friction effects as the workpiece is impelled by the force impulses edgewise toward stop surfaces for registering it. In order to combine one registered workpiece with another registered workpiece, a movable head is adapted to hold one of the workpieces thereon in a predetermined restrained position, as by suction action and to effect a predetermined movement of the restrained piece to bring it into combined relationship with the other.

In certain illustrative embodiments of the invention pulsating air flow units for providing force impulses to move the workpiece into registered position are mounted upon the movable head which also includes suction openings. These suction openings act to hold the registered workpiece to restrain it in position so that the movable head accomplishes the dual functions of registering and combining in a compact system arrangement which is advantageous in setting up the system for certain industrial applications. The registration operation and restraining operation of the suction openings are actuated in sequence so that the one function is accomplished before the next function commences. In further modified embodiments the registration is provided by a revolving suction member which is mounted upon the movable head to provide the dual functions of registering and combining in an advantageous system arrangement.

In this specification and in the accompanying drawings are described and shown fully automatic registration and combining methods and apparatus illustratively embodying the present invention, and certain modified embodiments are disclosed herein, but it is to be understood that these examples are not intended to be exhaustive or limiting of the invention. These illustrations are given so as to disclose the invention fully and clearly to those who are skilled in the art so that the reader will appreciate how this invention can be adapted and modified in various forms, each as may be best suited to the conditions of a particular production line.

The various objects, aspects and advantages of the present invention will be more fully understood from a consideration of the following description in conjunction with the accompanying drawings, in which:

FIG. 2 is an elevational view shown partially in section, this view being taken generally along the line 2—2 in FIG. 1 and being shown on enlarged scale;

FIG. 3 is a top plan view of the apparatus shown in FIG. 2;

FIG. 7 is an elevational view of a modified embodiment of the registration and movable combining head;

FIG. 8 is a top plan view of the embodiment of FIG. 7;

FIG. 9 is a elevational view of a further modified embodiment of the combining and registration head unit; and FIG. 10 is a plan view of an arrangement of four pulsating air flow jet units for registering a workpiece having two edge portions extending generally at right angles to each other, this view being shown on reduced scale.

Figure 1:
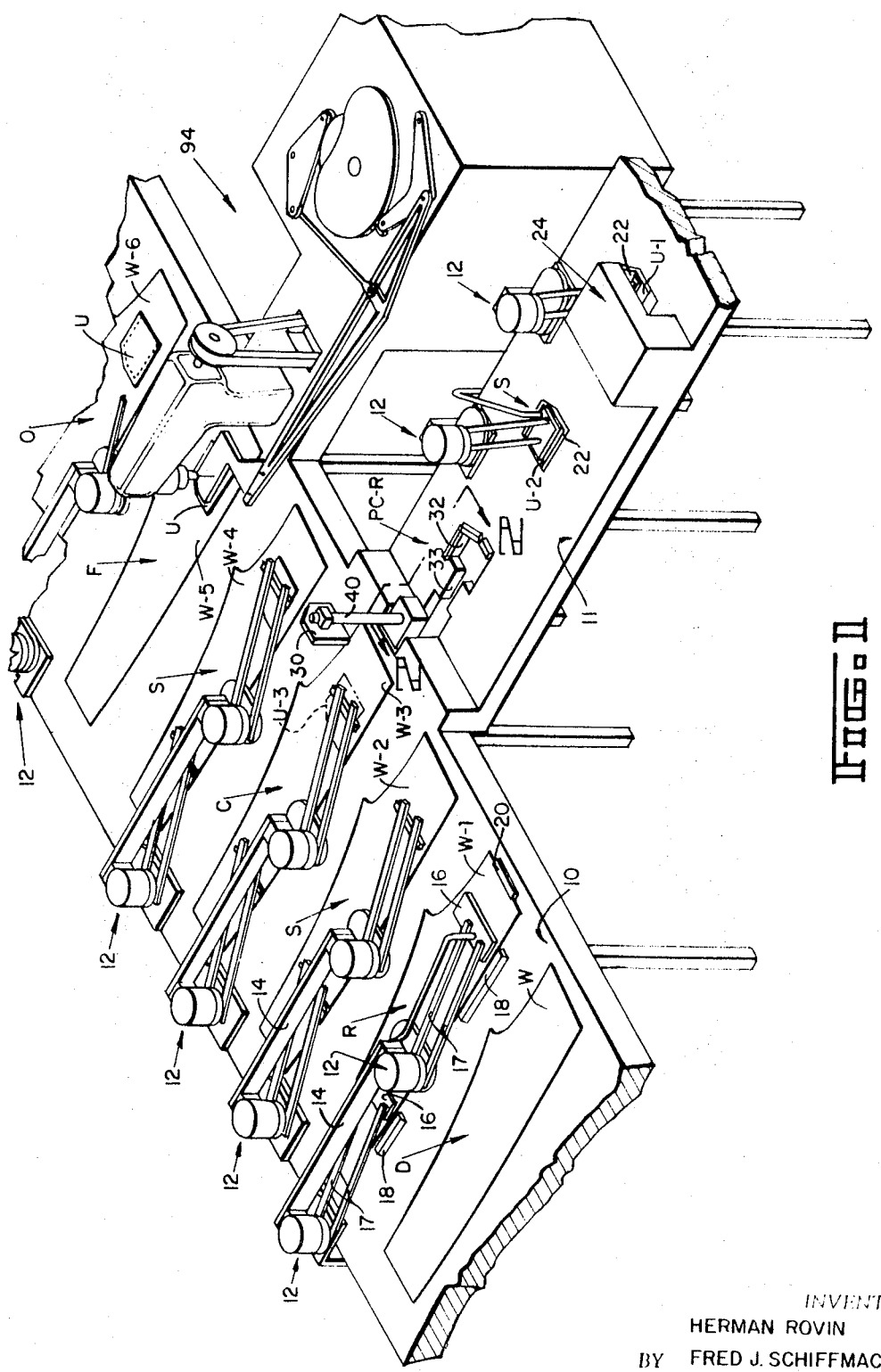
FIG. 1 is a perspective view illustrating registration and combining methods and apparatus embodying the present invention.

As shown in FIG. 1, various fabric workpieces W are supported by a large table or work surface 10 having a smooth upper surface with a low coefficient of friction, for example polished metal, slippery plastic, or the like. The workpieces W are moved along this support surface 10 in sequence into a plurality of stations including a registration station R, an intermediate station S, a combining station C, a further intermediate station S, a fastening station F and an output station O, the workpieces in these sequential stations being indicated as W-1, W-2, W-3, etc., respectively.

These workpieces are moved along this surface from station to station by a plurality of transfer modules 12 having movable arms, which may advantageously be similar to those described and claimed in the above-identified copending application of George F. Hawley, Ser. No. 601,768, filed on Dec. 14, 1966. In this production line the fabric workpieces W are illustratively shown as being panels of a general size and weight such as used in men's dungarees and they are relatively large so that the transfer modules 12 are arranged in pairs mounted upon common brackets 14 which are spaced above the table top 10. The arms of these transfer modules carry fabric engaging members providing a high friction grip upon the upper surface of each workpiece for sliding it along the surface 10, except that in moving the workpieces from the delivery station D to the registration station R they are lifted, moved and deposited, as will be explained below. Then, in moving from station R to the next station S the workpieces are slid.

The workpieces W are initially delivered to the delivery station D by any suitable arrangement, for example manually or by automatic equipment. The positioning of the workpiece in the delivery station D is not critical so long as it is located within general limits which may be indicated by index marks on the table 10.

A first pair of transfer modules 12 engage each of the workpieces W after it arrives in the delivery station D by suction pick up units 16 carried by their respective arms 17 which are elevated sufficiently during forward motion to lift the leading edge of the workpiece so that the workpiece will pass over the inclined forward surfaces of the stop means 18 as it is advanced along the supporting surface to registration station R. Thus, the transfer equipment 12, 16, 17 moves the workpiece forward with its leading edge slightly elevated until the trailing edge of the workpiece is somewhat beyond the stops 18 before lowering the workpiece onto the table and releasing it there. The swing arms 17 and suction units 16 are shown in FIG. 1 in the positions which they occupy after they have released the workpiece W-1 in the registration station R, this release being accomplished by momentarily shutting off the suction. The stop means 18 may have inclined forward ramp surfaces facing toward station D to enable the trailing edge of the workpiece to pass readily thereover.

Figure 4:
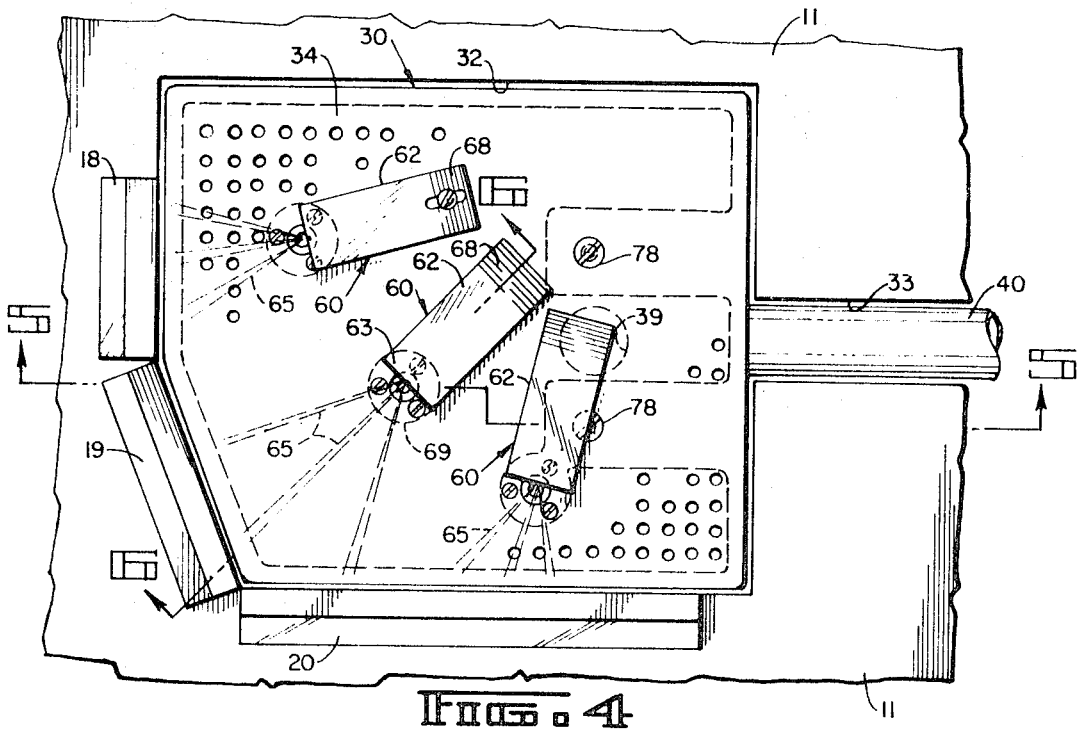
FIG. 4 is an enlarged plan view of the registration and combining unit which is seen in FIGS. 2 and 3.

A suitable registration mechanism beneath the table surface, for example as disclosed in my above-identified copending application Ser. No. 524,879 filed on Feb. 3, 1966, serves to propel the workpiece W-1 laterally and longitudinally against the vertical side surfaces of a plurality of stop means 18 and 20 thereby to register the workpiece W-1 in both coordinate directions with respect to the table 10 so that its orientation and location on the table are now precisely known. Alternatively, the workpiece may be registered at station R by a plurality of pulsating air flow jet units mounted in the table 10, such as shown in FIGS. 4 and 10, as will be described in detail further below.

The previously registered workpiece W-2 has been slid from station R along the top of the work table 10 by another pair of transfer modules 12 moving it into an intermediate station S where it dwells briefly while maintaining its accurately known registration. The operation of these transfer modules 12 in their sliding transfer mode is disclosed in the above-identified copending application of George F. Hawley, Ser. No. 601,768 filed on Dec. 14, 1966. In the next cycle of operation the workpiece W-2 will be transferred by another pair of transfer modules 12 over to a combining station C now occupied by the workpiece W-3 which is now in accurately known location at this combining station.

It is to be understood that the arms of all of the transfer modules are driven so as to swing back and forth approximately in unison and to pause in midstroke during their return when they are clear of the combining station C as the combining operation occurs. It will be understood that they are driven sufficiently in unison to carry out the sequential operations quickly and effectively without interference between adjacent transfer modules. During this return stroke all of the transfer arms are elevated so that they do not disturb the positions of the respective workpieces.

Other smaller workpieces U, which are to be combined with the workpiece W, for example such as hip pocket patches, are transferred along another work table 11 which converges with the main work table 10. These hip pocket workpieces U have had their edges previously turned over and creased as indicated at 22. This creasing of the edges 22 of the workpiece may be accomplished by utilizing creasing apparatus as indicated at 24 which is similar to that as disclosed in the above-identified copending application of George F. Hawley, Ser. No. 601,768. Since these are relatively smaller workpieces U they can be transferred by an individual transfer module 12 which moves the workpiece U-1 after it has been creased over to an intermediate station indicated at S and now containing a workpiece U-2.

Then a subsequent transfer module 12 is arranged to transfer the workpiece U-2 to a precombining and registration station indicated at PC-R which normally contains a movable registration and combining head 30. In FIG. 1 this movable head unit 30 is shown swinging up and over in preparation for delivering a workpiece U-3 to the position which it will occupy on top of the workpiece W-3 and indicated in dotted outline at U-3 in FIG. 1.

In order to explain more fully the operation of the registration and combining head 30, attention is now invited to FIGS. 2—6, inclusive. This head 30 normally occupies an opening 32 and slot 33 (FIG. 4) in the table 11 and it is capable of being moved over adjacent to the registered workpiece W-3 by being swung up and over into an inverted position adjacent to the top of this workpiece W-3 on the table 10, as seen in dash and dotted outline at 30' in FIG. 2. The workpiece U-2 is deposited onto the head unit 30 while this unit is located within its opening 32.

Associated with this head unit 30 are one or more registration stops 18 and 20 which may have their outer surfaces inclined as shown in FIG. 2 so as to enable an elevated workpiece to be moved readily thereover onto the workpiece engaging surface or face 34 of the movable head 30. The face 34 includes a perforated plate member (FIGS. 3 and 4) having a plurality of suction openings or vents 35 therein. Beneath the face 34 is a suction chamber 36 (FIGS. 5 and 6) defined by a housing 38 which forms the frame of the head 30. Suction is adapted to be drawn in the chamber 36 through a passage 39 (FIGS. 2 and 4) communicating with a hollow support arm 40 which is held in a bracket 41 clamped onto a rotatable shaft 42 held by bearings 43 (FIG. 3). A flexible suction hose 44 is connected at 45 to the movable support arm 40. This hose 44 extends from a suitable suction source, such as a vacuum pump, for drawing a suction in the chamber 36.

After the workpiece U-3 has been registered, as will be explained below, the pulsating air flow which provided the force impulses to produce registration is stopped, and the suction is started so as to restrain the registered workpiece in position on the face 34 of head 30. Then the combining head unit 30 is swung over into inverted position at 30' while the suction is maintained in the chamber 36 to hold the workpiece U-3 in registration on the surface 34.

In order to swing the head unit 30 over into inverted position at 30', a sprocket pulley 46 is connected to the shaft 42 and is driven by a timing belt 48 passing around a pulley sprocket 50 having a diameter twice that of the sprocket 46. This pulley sprocket 50 is driven by a connecting rod 52 extending to a crank arm 53 secured to the output shaft 54 of a speed-reducing gear unit 55 driven by an electric motor 56 mounted upon a fixed shelf 57 beneath the tables 10 and 11. For stopping the motor 56 at the end of each stroke of the connecting rod 52, there are control switches 58 which are actuated by elements 59 (FIG. 2) extending from the shaft of the sprocket 50.

When the fabric workpieces U-3 is being transferred by the module 12 onto the perforated suction plate 34 and during registration thereon, the suction is turned off so that the workpiece U-3 is freely slidable across the face 34. Shutoff of the suction is accomplished by the control switches 58 which have contacts included in a suitable control circuit with a solenoid-operated valve connected to the hose 44 and including sequence timing, as will be understood. Thus, the suction is shut off when the head unit is in its invented position thus depositing the registered workpiece U-3 precisely positioned on the workpiece W-3. Suction remains off during the return stroke and off until after the next workpiece has been transferred onto the face 34 and has been registered on the head 30.

As soon as the workpiece U-3 has been located generally on the head unit 30 a plurality of force impulses are applied to this workpiece so as to register its edges against the respective stops 18 and 20. In this way, the location and orientation of the workpiece U-3 becomes accurately known. In order to apply these force impulses there are a plurality of pulsating air flow jet components, as shown at 60. Each impulse jet component 60 is shown as including a deflectable, vibratable reed 62 having its free end 63 extending adjacent to an orifice 64 through which issues a pulsating flow of gaseous fluid. Any suitable inexpensive gas may be used, for example, such as compressed air which is supplied through flexible tubes 66.

This air is pulsated by oscillating valving which intermittently interrupts the air flow by turning it completely off and then turning it on full force as it is supplied to each of the jet impulse components 60 at a rate providing multiple impulses per second from each of the components 60 in sequence, as will be explained. An analogous technique includes an oscillating valve which alternately reduces and increases the air flow to each jet component 60 to create a pulsating flow which applies the desired force impulses to the workpiece. As the pulsating air flows up through each orifice 64, the free end 63, 63' of the vibratable reed 62 deflects this air flow so as to travel along a path 65 (FIG. 6) closely adjacent to the surface of plate 34 in a direction toward the inner vertical surface of the respective stops 18, 19, or 20. Each pulse of air 65 imparts a force impulse to the workpiece U-3 so as to lift and urge it toward the respective stops 18, 19 or 20. Also, the air flow passing the free end 63 causes the vibratable reed 62 to be deflected up somewhat to a second position 63' which is slightly farther from the aperture 64, and thus the reed is set in vibrating movement toward and away from the mouth of the aperture 64. The vibrating or fluttering motion of the reed end of 63 away from the aperture 64 beats against the lower surface of the workpiece U-3 so as to produce an agitation or fluttering thereof, thus tending to reduce friction effects and enabling the pulsating air flow 65 more readily to urge this workpiece toward the adjacent stop 18. The other jet components 60 similarly impel the workpiece toward the stops 19 and 20 as desired.

The relationship of the end of the vibratable reed 63 and the mouth of the aperture 64 is not critical, except that it should cause a deflection of the air stream to provide a substantial component of flow in the desired direction of movement. In this example it is noted that the end 63 extends approximately one-half of the distance across the mouth of the orifice 64. The desired relationship is that the reed should be sufficiently close to and extend sufficiently far across the mouth of the aperture so that the reed will serve to deflect the air flow or to aid in deflecting the air flow to provide a component of flow in the general direction toward which it is desired to impel the edge of the workpiece. Also, it is helpful if the reed can deflect as discussed above to impart a beating to the workpiece. This beating is not necessary to provide satisfactory registration, but my experience indicates that it is helpful in accelerating the fabric movement.

I have found that the vibrating reed is especially helpful in effecting rapid registration of relatively large or heavy workpieces. Where the workpiece to be registered is relatively small and light in weight, the vibrating reed function has less significance in effecting rapid registration of such a workpiece. If this reed 62 is made stiff and short, the reed will not vibrate any appreciable amount, but nevertheless registration can be satisfactorily accomplished. Instead of using the reed element 62 an means for deflecting the air stream, the axis of the orifice 64 can be at an angle to the surface 34 rather than being perpendicular thereto as shown. I prefer to use the reed 62 as air deflection means rather than drilling the orifice 64 at an angle, because this reed arrangement provides much greater flexibility in installation and setup of the production line.

In summary, the multiple functions provided by the reed element 62 are as follows: (1) Provide air deflection, (2) Adjust direction and characteristics of air flow, (3) Agitate the workpiece by vibration to reduce friction effects, (4) Adjust characteristics of the agitation by utilizing different stiffness and size of reed, and (5) Control relative amount of air by controlling size of opening. The fixed end of the reed may be attached or coupled to a small region 68 (FIG. 4) of the surface of the perforated plate 34, as by an adjustment screw in a slot or by cement. The reed 62 can be changed in length or stiffness, and it can be removed and repositioned repeatedly by adjusting it in place until the most effective reed length, stiffness and location is obtained for handling any particular workpiece having material content of particular characteristics. The edges of this reed are smoothed and faired into the surface 34 to prevent any snagging of the lower surface of the fabric thereagainst.

Figure 5:
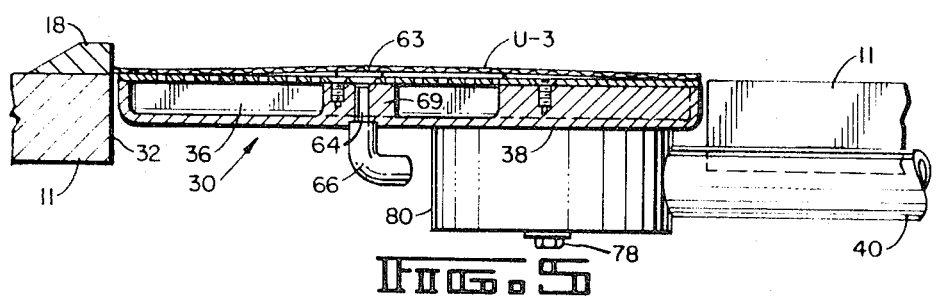
FIG. 5 is a sectional view taken along the line 5—5 of FIG. 4.
Figure 6:
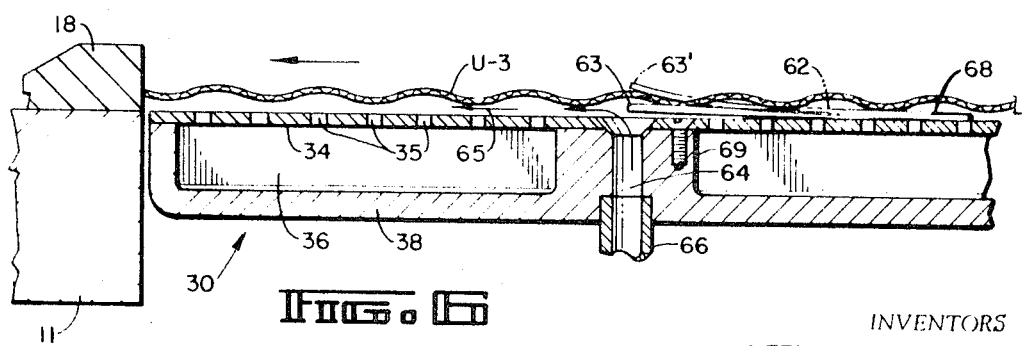
FIG. 6 is another sectional view of FIG. 4 taken along the line 6—6 and shown on further enlarged scale to illustrate aspects of the registration process.

The aperture 64 is formed in a base member 69 extending up from the casing 38 into contact with the suction plate 34. To provide additional strength the suction plate 34 may be attached to this upstanding member 69 by one or more machine screws as shown in FIGS. 5 and 6.

In order to create pulsation of the air jets issuing from the respective orifices 65, fast-oscillating valve means 70 (FIG. 2) are provided and include a hollow motor driven rotating distributor 72 into which compressed air is fed at suitable pressure, for example 30 to 45 pounds per square inch. A revolving outlet port 73 from this distributor communicates in sequence with a plurality of fixed ports 74 in the valve casing 75 to which the respective tubes 66 are connected. Thus, pulses of air are fed sequentially into the respective tubes 66, and these tubes are connected to the respective impulse units 60 in accordance with the desired sequence of force impulses to be applied to the workpiece.

In this illustrative example the first impulse is generally toward stop 18, the second is generally toward stop 19 and the third is generally toward stop 20, and then the cycle repeats. The number and arrangement of the impulse units 60 depends upon the size and weight of the workpiece and the characteristics of its material content. Generally speaking, when handling larger, heavier workpieces it will be found that a larger number of the force impulse components 60 may be used to advantage, such as four to six of them, for example, such as shown in FIG. 10. When handling smaller workpieces one, two or three usually will be found to work to advantage.

Instead of using a sequence of three impulses in a cycle, a sequence of two in a cycle may be used, in which event the force impulses are directed generally toward the two outer stops 18 and 20 in alternating sequence. Such a sequence of two pulses in alternate directions per cycle can readily be generated by a pneumatically driven oscillating valve, such as are commercially available.

In FIG. 10, a pair of pulsating air jet components 60 are aimed generally toward the stop 18 and are both connected to an air supply line 66-1. Another pair of these components 60 are aimed generally toward the stop 20 and are both connected to another air supply line 66–2. Compressed air is alternatively supplied to these sets of ganged units 60 from a pneumatically driven fast-acting oscillating valve 70A which has a pair of output connections alternatively feeding the lines 66–1 and 66–2 from an input source line 76, containing air at a pressure in the range from 30 to 45 p.s.i.

The outline of the workpiece to be registered is indicated in dashed and dotted outline at W. This arrangement as shown in FIG. 10 is typical of that used for handling a workpiece having a pair of edge portions extending generally at a large angle for engaging the respective stops 18 and 20. The outer units 60 are aimed generally perpendicular to the respective stops 18 and 20 and the inner ones are angled inwardly somewhat toward the intermediate corner as shown by the direction arrows.

Returning attention to FIGS. 2 through 6, it is noted that the registration is accomplished in a few seconds time, or less, after which the pulsating air is shut off. After shutoff of the pulsating air, the suction is turned on so that the suction effect of the openings 35 holds the workpiece, firmly restraining it against moving as the head unit is swung up and over as seen in FIG. 1 and as indicated by the dashed and dot circular arcs 77 (FIG. 2).

The head 30 can be adjusted in position relative to its arm 40 by means of mounting screws 78 (FIGS. 2, 3 and 5) engaging in arcuate slots 79 in a support hub 80 at the end of the arm 40.

FIGS. 7 and 8 show a modified movable registration and combining head 30A which is similar to the unit 30 except that a rotatable hollow impeller member 82 is mounted below and aligned with a slot 84 in the perforated plate 34 for registering the workpiece. The hollow member 82 is cylindrical and its top protrudes through the slot 84 only slightly above the surface 34, being almost tangent to this surface. Such a rotatable hollow member is shown and claimed in my copending application identified above.

This rotatable member 82 includes a row of suction openings 85 and is enveloped within the slot 84 to a large extent by a curved vacuum shield 86. A source of suction is applied to the interior of the rotatable member 82 by a flexible hose 88 connected through a hollow bearing to one end thereof. Rotation is provided by a driven pulley 89 connected to its other end and being engaged by a belt 90 running from a drive pulley 92 which is coaxial with the axis of shaft 42. The suction effect of the moving openings 85 as the member 82 is rotated applies a sequence of force impulses to the workpiece U–3 to impel it toward the stop 18, which is here shown at the opposite relative end of the head 30A as compared with the showing in FIGS. 2—6. Another hollow member can be included with its axis of rotation extending at an angle to the axis of the member 82 for registering workpiece in two directions if required. Such additional member can be driven by a curved flexible tubular coupling through which suction is provided, for example as described in my said copending application, and its suction openings are arranged to apply the force impulses alternately in each of two directions toward the respective stops.

It will be appreciated that throughout the FIGS. 1 through 8 the head 30 (and 30A) nests in the opening 32 in table 11 (seen clearly in FIG. 1) and pivots about the axis 42a of the rotatable shaft 42. The pivot axis 42a (shown in FIG. 2) is illustrated positioned above the level of the fabric supporting surface or face 34 of the head 30 at a point between the plane of the surface of the table 10 and the plane of the table 11. This permits transfer of a workpiece U–3 from a lower surface such as 11 to a higher level surface, such as 10. This change in elevation is clearly illustrated in FIG. 2.

Referring to FIG. 9, the head 30B is illustrated as nesting in an opening 32B in the surface of table 10. The level of the surface of table 10 is assumed to be above the level of the surface of table 11 (not shown in FIG. 9). The pivot point 42a' is illustrated as positioned below the face 34 of the head 30B. Thus, in this construction movement of a workpiece may be accomplished from a lower surface of table 11 to the higher surface of table 10.

The head unit 30B shown in FIG. 9 is similar to that shown in FIGS. 7 and 8 except that registration is arranged to occur on the surface 34 after the workpiece U–3 has been carried over from the surface of table 11. In this arrangement, it is assumed that a workpiece is transferred along the surface of the table 11 to a position where the face of head 30B will come adjacent to the surface of table 11, when the head 30B is swung over arcuately into its inverted position as indicated by the arcs 77. The suction through the openings 35 (shown in FIG. 8) is used to pick up the workpiece U–3 from the table 11.

After pickup of the workpiece is accomplished, movement of the workpiece is effected when the head 30B is returned to the combining station C holding such workpiece. The workpiece may then be registered against stop 18 after removal of the suction force. Thereafter, another workpiece may be combined with the registered workpiece in station C by other combining means, as will be understood.

Thus, it will be appreciated that the workpiece can conveniently be registered, combined, and moved from one level to another. The registration can be carried out in the combining station or before the combining station. If it is desired to have table 11 at the same elevation as table 10, then the pivot axis 42a is located in the plane of the face 34 of the head 30, 30A or 30B.

After combining the workpiece may be transferred to a fastening station F where they are suitably fastened together, for example by an automatic sewing machine system 94, which does not form a part of the present invention. The assembled workpieces W–6 are transferred over to the output station O.

It is to be noted that the registration stops 18, 19 or 20 need not be immediately adjacent to the edge of the opening 32 in the table 11. One or more of them can be spaced away from the edge of the openings 32. Also, it is to be noted that the movable head 30, 30A, or 30B need not be the same shape as the workpiece being registered and combined thereby. In some cases it may be desirable to register toward the outer end of the head 30, 30A or 30B, or toward the inner end or toward one side or the other.

As used herein the term "pulsating" intended to cover and include all of the various ways in which the air flow may be changed to impel the workpiece by a plurality of force impulses, for example to include turning the air flow completely on and off rapidly, and to include fluctuating, varying, or undulating the air flow.

From the foregoing it will be understood that the illustrative embodiments of the methods and apparatus of the present invention are well suited to provide the advantages set forth, and since many possible embodiments may be made of various features of this invention and as the methods and apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, all without departing from the scope of the invention as defined by the following claims.

We claim:

1. The process of registering a fabric workpiece into a known position and of combining the registered workpiece with another workpiece comprising the steps of providing a stop at a known position, placing a first workpiece upon a supporting surface with an edge of said workpiece spaced from said stop, flowing air beneath said workpiece and adjacent to said supporting surface directed generally toward said stop and fluctuating said air flow for propelling the edge of the workpiece against said stop to register the workpiece, applying suction through said supporting surface to said fabric workpiece for holding the workpiece firmly against said surface in registered position, while continuing applying said suction moving said supporting surface adjacent to a second workpiece, and discontinuing said suction for releasing the registered workpiece against the second workpiece to combine them.

2. The process of registering and combining as claimed in claim 1 and wherein said supporting surface is initially facing upwardly during the registration of said first workpiece thereon and is turned into an inverted position adjacent to said second workpiece, and then said suction is discontinued for releasing the first workpiece onto the second workpiece in registered position thereon.

3. The process of registering a fabric workpiece into a predetermined position and of combining the registered workpiece with a second workpiece as claimed in claim 1 including the steps of swinging the supporting surface from a first position upwardly and over a pivot axis to a second position spaced from said first position, said registered workpiece at said second position being immediately above and adjacent to said second workpiece, and of depositing said registered workpiece upon said second workpiece by discontinuing said suction.

4. The process of registering a fabric workpiece in a predetermined position and of combining the registered workpiece with a second workpiece as claimed in claim 3 and wherein said second position is in a plane at a different elevation from the plane of said first position.

5. Apparatus for registering a fabric workpiece into a known position and for delivering the registered workpiece into a desired location comprising drive means, movable head means having a fabric workpiece supporting surface and movable by said drive means from a first position to a second position, stop means associated with said surface, a source of air under pressure, air-flowing means coupled to said source for flowing air along said surface beneath said workpiece generally toward said stop means, and means for fluctuating said flowing air for propelling an edge of the workpiece toward and against said stop means to register the workpiece, means for holding the workpiece in registered position on said surface while the surface is moved to its second position, and release means for releasing the workpiece from the surface at said second position.

6. Apparatus for registering a fabric workpiece as claimed in claim 5 and wherein said air-flowing means includes an opening in an interior region of said surface, said holding means including a plurality of suction openings in said surface and a suction source connected to said openings, and said release means discontinues the suction when said surface is at its second position.

7. Apparatus as claimed in claim 5 and including a work table, said movable surface in its first position being on the level of said worktable, and said stop means being located on said worktable generally near to the edge of said surface for engaging with the edge of a workpiece resting on said surface.

8. Apparatus as claimed in claim 7 and wherein said worktable has a cutout therein, said movable work-supporting surface in its first position fitting into said cutout.

9. Apparatus as claimed in claim 8 and wherein said movable work-supporting surface in its first position faces upwardly and at said second position is inverted.

10. Apparatus for registering and combining a fabric workpiece comprising a combining station, means for moving a fabric workpiece into said combining station, a movable head unit having a suction chamber therein, said head unit including a work-supporting surface having a plurality of openings therein communicating with said suction chamber, drive means connected to said head unit for moving said head unit into an inverted position adjacent to said first workpiece in said combining station and for moving said head unit into an upright position spaced from said combining station, means for moving a second workpiece onto said head unit in its upright position, stop means associated with said head unit in its upright position, impelling means mounted upon said head unit and associated with said work-supporting surface for impelling the workpiece edgewise toward said stop means for registering an edge of the workpiece thereagainst, means for producing a suction in said chamber after registering said edge for holding said second workpiece against said surface while said head unit is inverted adjacent to said first workpiece in said combining station, and means for shutting off said suction for releasing said second workpiece into registered relationship onto said first workpiece in said registration station.

11. Apparatus for registering and combining a fabric workpiece as claimed in claim 10 and wherein said impelling means includes an orifice in said work-supporting surface, means for flowing air through said orifice and beneath said second workpiece directed generally toward said stop means, and means for fluctuating said flowing air for applying a plurality of force impulses to said second fabric workpiece.

12. Apparatus for registering and combining a fabric workpiece as claimed in claim 10 and wherein said impelling means includes a rotatable member having suction openings therein and drive means for rotating said member for impelling an edge of said second workpiece toward said stop means.

13. The method of combining together two fabric workpieces in accurately predetermined relationship comprising the steps of providing a registration stop at a known location, placing the first fabric workpiece upon a supporting surface with an edge of the workpiece spaced from said stop, applying force impulses to the workpiece for propelling the edge of the workpiece against the registration stop for registering the first fabric workpiece, applying suction through said supporting surface to said first fabric workpiece for holding said first fabric workpiece thereon in registered position, registering the second workpiece in inverted position relative to the first workpiece, while said first workpiece is being restrained by said suction swinging said supporting surface with said first workpiece thereon over into an inverted position closely adjacent to said second workpiece, and releasing said first workpiece from said supporting surface for combining it with said second workpiece in accurately predetermined relationship therewith.